United States Patent
Klimpel (10) Patent No.: US 10,435,160 B2
(45) Date of Patent: Oct. 8, 2019

(54) AIRCRAFT AIR CONDITIONING SYSTEM WITH AMBIENT AIR SUPPLY AND METHOD FOR OPERATING SUCH AN AIRCRAFT AIR CONDITIONING SYSTEM

(71) Applicant: Airbus Operations GmbH, Hamburg (DE)

(72) Inventor: Frank Klimpel, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 273 days.

(21) Appl. No.: 15/358,459

(22) Filed: Nov. 22, 2016

(65) Prior Publication Data

US 2017/0152050 A1 Jun. 1, 2017

(30) Foreign Application Priority Data

Nov. 27, 2015 (DE) .......................... 10 2015 223 548

(51) Int. Cl.
*B64D 13/08* (2006.01)
*F25B 13/00* (2006.01)
(Continued)

(52) U.S. Cl.
CPC ............. *B64D 13/08* (2013.01); *B64D 13/06* (2013.01); *F25B 13/00* (2013.01); *F25B 41/04* (2013.01);
(Continued)

(58) Field of Classification Search
CPC .... B64D 2013/0618; B64D 2013/0648; B64D 2013/0688; B64D 13/02; B64D 13/06; B64D 13/08; B64D 2013/064; F25B 9/004
See application file for complete search history.

(56) References Cited

U.S. PATENT DOCUMENTS 4,263,786 A * 4/1981 Eng .................... B64D 13/06 62/172
4,283,924 A * 8/1981 Schutze ................ B64D 13/06 62/172
(Continued)

FOREIGN PATENT DOCUMENTS

CN 104276287 A 1/2015
DE 102008053320 5/2010
(Continued)

OTHER PUBLICATIONS

German Search Report, dated Oct. 14, 2016, priority document.
Chinese Examination Report for corresponding Chinese Patent Application No. 201611052837.6.

*Primary Examiner* — Frantz F Jules
*Assistant Examiner* — Lionel Nouketcha
(74) *Attorney, Agent, or Firm* — Greer, Burns & Crain, Ltd.

(57) ABSTRACT

An aircraft air conditioning system comprises an ambient air supply line adapted to be flown through with ambient air, an ambient air cooling apparatus, which is connected to the ambient air supply line and is configured to cool the ambient air flowing through the ambient air supply line, an ambient air discharge line, which is connected to the ambient air cooling apparatus and is connectable to an aircraft cabin, in order to conduct ambient air cooled by the ambient air cooling apparatus into the aircraft cabin, a process air supply line adapted to be flown through with compressed process air, a process air cooling apparatus, which is connected to the process air supply line and is configured to cool the compressed process air flowing through the process air supply line, a process air discharge line, which is connected to the process air cooling apparatus and is connectable to the aircraft cabin, in order to conduct process air cooled by the process air cooling apparatus into the aircraft cabin, and a
(Continued)

refrigerating apparatus, which comprises a refrigerant circuit adapted to be flown through with a refrigerant and being thermally coupled to the ambient air cooling apparatus and to the process air cooling apparatus, in order to transfer thermal energy from the ambient air cooling apparatus and the process air cooling apparatus to the refrigerant circulating in the refrigerant circuit. A bypass line branching off from the process air discharge line is configured to discharge the cooled process air flowing through the process air discharge line into an aircraft environment at least in certain operating phases of the aircraft air conditioning system.

15 Claims, 1 Drawing Sheet

(51) Int. Cl.
  *F25B 41/04* (2006.01)
  *F25B 49/02* (2006.01)
  *B64D 13/06* (2006.01)
(52) U.S. Cl.
  CPC ........ *F25B 49/02* (2013.01); *B64D 2013/064* (2013.01); *B64D 2013/0618* (2013.01); *B64D 2013/0648* (2013.01); *B64D 2013/0674* (2013.01); *B64D 2013/0688* (2013.01); *F25B 2600/2501* (2013.01); *Y02T 50/56* (2013.01)

(56) References Cited

U.S. PATENT DOCUMENTS

| | | | |
|---|---|---|---|
| 5,899,085 A * | 5/1999 | Williams | B64D 13/06 62/236 |
| 5,971,982 A | 10/1999 | Betsill et al. | |
| 7,305,842 B1 | 12/2007 | Schiff | |
| 7,797,962 B2 * | 9/2010 | Kresser | B64D 13/06 62/401 |
| 8,333,078 B2 | 12/2012 | Kelnhofer | |
| 10,059,457 B2 | 8/2018 | Klimpel et al. | |
| 10,071,807 B2 | 9/2018 | Kelnhofter | |
| 2004/0195447 A1 * | 10/2004 | Claeys | B64D 13/06 244/118.5 |
| 2010/0101251 A1 | 4/2010 | Kelnhofer | |
| 2013/0160472 A1 | 6/2013 | Klimpel et al. | |
| 2013/0269374 A1 | 10/2013 | Kelnhofer | |
| 2014/0144163 A1 | 5/2014 | Klimpel et al. | |
| 2014/0295747 A1 | 10/2014 | Schmid et al. | |
| 2015/0013355 A1 | 1/2015 | Klimpel et al. | |

FOREIGN PATENT DOCUMENTS

| | | | |
|---|---|---|---|
| DE | 102010034830 | 2/2012 | |
| DE | 102010054418 A1 | 6/2012 | |
| EP | 2651763 | 10/2013 | |
| EP | 2735510 | 5/2014 | |
| EP | 2786935 | 10/2014 | |
| EP | 2821346 | 1/2015 | |
| EP | 2998223 A1 * | 3/2016 | B64D 13/06 |
| WO | 2012022758 | 2/2012 | |

* cited by examiner

AIRCRAFT AIR CONDITIONING SYSTEM WITH AMBIENT AIR SUPPLY AND METHOD FOR OPERATING SUCH AN AIRCRAFT AIR CONDITIONING SYSTEM

CROSS-REFERENCES TO RELATED APPLICATIONS

This application claims the benefit of the German patent application No. 10 2015 223 548.3 filed on Nov. 27, 2015, the entire disclosures of which are incorporated herein by way of reference.

BACKGROUND OF THE INVENTION

The invention relates to an aircraft air conditioning system and a method for operating an aircraft air conditioning system.

In commercial aircraft, so-called air-supported air conditioning systems such as are described, for example, in DE 10 2008 053 320 B4 and U.S. Pat. No. 8,333,078 B2 or EP 2 651 763 A2 and US 2013/269374 A1 are normally used at present for air conditioning the aircraft cabin. An aircraft air conditioning system is used for adjusting and maintaining a desired pressure, a desired temperature and a desired air humidity in an aircraft cabin. Furthermore, the aircraft air conditioning system supplies adequate fresh air to the aircraft cabin in order to ensure that a prescribed minimum amount of fresh air is present in the aircraft cabin.

Air-supported aircraft air conditioning systems normally comprise an air conditioning unit, to which compressed process air is supplied from the engines of the aircraft, a separate compressor or an auxiliary engine (APU, Auxiliary Power Unit). In flight mode of the aircraft, engine bleed air is predominantly used to supply the air conditioning unit of the aircraft air conditioning system with compressed process air. In ground operation of the aircraft, on the other hand, compressed process air is normally supplied to the air conditioning unit of the aircraft air conditioning system from the auxiliary power unit or an air production unit outside the aircraft. In the air conditioning unit the process air is cooled and expanded upon flowing through at least one heat exchanger unit and various compression and expansion units. Cooled process air emerging from the air conditioning unit is finally conducted into a mixing chamber and mixed there with recirculation air taken away from an aircraft area to be air conditioned. The mixed air from the mixing chamber is conducted via corresponding mixed air lines into the aircraft area to be air conditioned, which can be in the form of a passenger cabin, a cockpit, a cargo hold, a crew rest room or similar.

DE 10 2010 034 830 A1 and WO 2012/022758 A1 describe an aircraft air conditioning system in which compressed process air, which is taken from an engine of the aircraft, is cooled by the transfer of heat to a coolant flowing through a cooling circuit. A turbine, which serves to expand the compressed process air before it is supplied to an aircraft cabin, is used to drive a compressor arranged in the cooling circuit.

An aircraft air conditioning system is known from EP 2 821 346 A1 and US 2015/013355 A1 that comprises an ambient air supply line adapted to be flown through with ambient air. An ambient air cooling apparatus, which is connected to the ambient air supply line, is configured to cool the ambient air flowing through the ambient air supply line. The aircraft air conditioning system further comprises an ambient air discharge line, which is connected to the ambient air cooling apparatus and connectable to an aircraft cabin, and a supply line for compressed bleed air, which is adapted to be flown through with compressed air. A cooling apparatus for compressed air is connected to the supply line for compressed bleed air and is configured to cool the compressed air that flows through the supply line for compressed bleed air. A discharge line for compressed air is connected to the cooling apparatus for compressed air and is connectable to the aircraft cabin. A refrigerating apparatus comprises a refrigerant circuit which is adapted to be flown through with a two-phase refrigerant and is configured to convert the two-phase refrigerant on flowing through the refrigerant circuit from the liquid state of aggregation to the gaseous state of aggregation and then from the gaseous state of aggregation back to the liquid state of aggregation again, wherein the refrigerant circuit of the refrigerating apparatus is configured to supply cooling energy to the ambient air cooling apparatus and the cooling apparatus for compressed air.

SUMMARY OF THE INVENTION

An object of the invention is to provide an aircraft air conditioning system that can be operated flexibly in various operating states and facilitates energy-efficient and fuel-saving air conditioning of an aircraft cabin. An object of the invention is also to specify a method for operating such an aircraft air conditioning system.

An aircraft air conditioning system comprises an ambient air supply line adapted to be flown through with ambient air. The aircraft air conditioning system further comprises an ambient air cooling apparatus, which is connected to the ambient air supply line and is configured to cool the ambient air flowing through the ambient air supply line. The ambient air cooling apparatus may comprise a heat exchanger, for example. An ambient air discharge line is connected to the ambient air cooling apparatus and is connectable to an aircraft cabin. Ambient air cooled by the ambient air cooling apparatus can thus be conducted into the aircraft cabin via the ambient air discharge line.

The aircraft air conditioning system further comprises a process air supply line adapted to be flown through with compressed process air. The process air supply line may be connectable to an engine or an auxiliary power unit of an aircraft equipped with the aircraft air conditioning system. The process air supply line can then be supplied with bleed air taken from the engine or the auxiliary power unit. Alternatively to this, however, the process air supply line may also be connectable to a compressor formed independently of an engine or an auxiliary power unit of the aircraft, which supplies compressed process air to the process air supply line. The supply of compressed process air to the process air supply line can be controlled by a valve arranged in the process air supply line.

A process air cooling apparatus is connected to the process air supply line and is configured to cool the compressed process air flowing through the process air supply line. Like the ambient air cooling apparatus, the process air cooling apparatus may also comprise a heat exchanger. A process air discharge line is connected to the process air cooling apparatus and is connectable to the aircraft cabin. Process air cooled by the process air cooling apparatus can thus be conducted via the process air discharge line into the aircraft cabin.

A refrigerating apparatus of the aircraft air conditioning system comprises a refrigerant circuit adapted to be flown through with refrigerant and being thermally coupled to the ambient air cooling apparatus and the process air cooling apparatus, in order to transfer thermal energy from the ambient air cooling apparatus and the process air cooling apparatus to the refrigerant circulating in the refrigerant circuit. The ambient air flowing through the ambient air supply line and the process air flowing through the process air supply line are thus cooled by the emission of thermal energy to the refrigerant circulating in the refrigerant circuit of the refrigerating apparatus, so that the cabin of an aircraft equipped with the aircraft air conditioning system can be provided with both cooled process air and cooled ambient air in normal operation of the aircraft air conditioning system. The quantity of cooled process air required to ensure proper air conditioning of the aircraft air conditioning system can be reduced by this. In particular, when the process air flowing through the process air supply line is provided by an engine or an auxiliary power unit of the aircraft, this makes it possible to reduce the fuel consumption of the aircraft. It can also be guaranteed by the supply of cooled ambient air to the aircraft cabin that sufficient fresh air is supplied to the aircraft cabin.

The refrigerant circulating in the refrigerant circuit of the refrigerating apparatus is preferably a two-phase refrigerant, which upon flowing through the refrigerant circuit, is transferred on the take-up of thermal energy by the ambient air cooling apparatus and the process air cooling apparatus from the liquid state of aggregation to the gaseous state of aggregation and is then converted from the gaseous state of aggregation back to the liquid state of aggregation again by suitable pressure and temperature control in the refrigerant circuit of the refrigerating apparatus. For example, R134A ($CH_2F$—$CF_3$), $CO_2$ or R245fa (1,1,1,3,3-pentafluoropropane), may be circulated as two-phase refrigerant in the refrigerant circuit of the refrigerating apparatus. The cooling process used to cool the ambient air cooling apparatus and the process air cooling apparatus is consequently realized preferably as a cold vapor process, which is distinguished by high energy efficiency.

The ambient air cooling apparatus may be formed in the form of a refrigerant evaporator, which creates a thermal coupling between the ambient air flowing through the ambient air supply line and the refrigerant circulating in the refrigerant circuit of the refrigerating apparatus. The ambient air can then be cooled by the transfer of thermal energy to the refrigerant, wherein the refrigerant is transferred upon the take-up of thermal energy from the ambient air in the ambient air cooling apparatus from the liquid to the gaseous state of aggregation. In addition or alternatively to this, the process air cooling apparatus may also be formed in the form of a refrigerant evaporator, which creates a thermal coupling between the process air flowing through the process air supply line and the refrigerant circulating in the refrigerant circuit of the refrigerating apparatus. The process air can then be cooled by the transfer of thermal energy to the refrigerant, wherein the refrigerant is transferred upon the take-up of thermal energy from the process air in the process air cooling apparatus from the liquid to the gaseous state of aggregation.

The ambient air cooling apparatus and the process air cooling apparatus are preferably coupled parallel to one another to the refrigerant circuit of the refrigerating apparatus. In particular, the ambient air cooling apparatus and the process air cooling apparatus may be arranged parallel to one another in the refrigerant circuit of the refrigerating apparatus. In addition to the ambient air cooling apparatus and the process air cooling apparatus, a refrigerant compressor, a condenser, a refrigerant collector and/or an expansion valve may be arranged in the refrigerant circuit of the refrigerating apparatus.

The refrigerant compressor may be formed, for example, in the form of a centrifugal compressor. The condenser is preferably coupled thermally to a ram air duct, so that thermal energy can be transferred from the condenser to the ram air flowing through the ram air duct. For example, the condenser may be formed in the form of a heat exchanger arranged in a ram air duct. The refrigerant collector is preferably arranged downstream of the refrigerant condenser in the refrigerant circuit of the refrigerating apparatus and is used for interim storage of refrigerant emerging from the condenser in the liquid state of aggregation. The ambient air cooling apparatus and the process air cooling apparatus are preferably arranged downstream of the expansion valve in the refrigerant circuit of the refrigerating apparatus. The term "downstream" refers here to the flow direction of the refrigerant through the refrigerant circuit of the refrigerating apparatus.

Finally, the aircraft air conditioning system comprises a bypass line branching off from the process air discharge line. The bypass line is configured to discharge the cooled process air flowing through the process air discharge line into an aircraft environment, at least in certain operating phases of the aircraft air conditioning system. The aircraft air conditioning system can thus be operated in a mixed air mode, in which the aircraft cabin is supplied with both cooled process air and cooled ambient air. If desired or necessary, i.e., if no process air is to be conducted from the process air discharge line into the aircraft cabin in certain operating phases of the aircraft air conditioning system, the aircraft air conditioning system can also be operated in a pure ambient air mode, however, in which no process air from the process air discharge line, but only ambient air from the ambient air discharge line is supplied to the aircraft cabin. In pure ambient air mode, the entire process air from the process air discharge line is discharged via the bypass line into the aircraft environment. This facilitates a particularly flexible operation of the aircraft air conditioning system.

In principle the process air discharge line may be directly connectable to the aircraft cabin, in order to conduct the process air flowing through the process air discharge line directly into the aircraft cabin. However, the process air discharge line is preferably connectable to the aircraft cabin via a mixing chamber, in which the process air is mixed with recirculation air taken away from the aircraft cabin. In a similar manner the ambient air discharge line may be connectable directly to the aircraft cabin, in order to conduct the ambient air flowing through the ambient air discharge line directly into the aircraft cabin. However, the ambient air discharge line is preferably connectable to the aircraft cabin via a mixing chamber, in which the ambient air from the ambient air discharge line is mixed with recirculation air taken away from the aircraft cabin and if applicable with air from the process air discharge line.

If cooled process air and cooled ambient air are supplied to the mixing chamber, i.e., the aircraft air conditioning system is operated in mixed air mode, the process air and the ambient air are mixed in the mixing chamber with the recirculation air from the aircraft cabin. The aircraft cabin is then supplied with mixed air comprising cooled process air, cooled ambient air and recirculation air. On the other hand, if no process air but only cooled ambient air is supplied to the mixing chamber, i.e., the aircraft air conditioning system is operated in pure ambient air mode, the ambient air is mixed in the mixing chamber with the recirculation air from the aircraft cabin. The aircraft cabin is then supplied with mixed air comprising cooled ambient air and recirculation air.

A control device of the aircraft air conditioning system is preferably configured to control the process air flow through the bypass line in dependence on an operating state of a process air source and/or in dependence on a composition of the cooled process air flowing through the process air discharge line. For example, the control device may be configured to discharge the cooled process air flowing through the process air discharge line via the bypass line into the aircraft environment if a malfunction of the process air source is detected, for example by suitable sensors. Alternatively or in addition to this, the control device may be configured to discharge cooled process air flowing through the process air discharge line via the bypass line into the aircraft environment if the process air does not have the desired composition.

In particular, the control device may be configured to control the process air flow through the bypass line in such a way that the cooled process air flowing through the process air discharge line is discharged via the bypass line into the aircraft environment if a quality parameter of the process air exceeds a threshold value. The quality parameter of the process air may be a limit value of a substance contained in the process air, for example, which should not be exceeded. The quality parameter of the process air may be determined, for example, by suitable sensors arranged in the process air supply line and/or the process air discharge line. By controlling the operation of the aircraft air conditioning system in such a way it is ensured that process air that is not suitable for supplying to the aircraft cabin does not reach the aircraft cabin.

A bypass valve for controlling the process air flow through the bypass line may be arranged in the bypass line. The operation of the bypass valve may be controlled by the control device of the aircraft air conditioning system. The bypass valve may be executed in the form of a valve with a variable flow cross section. In the fully open state of the bypass valve, the entire process air flowing through the process air discharge line is preferably conducted away into the aircraft environment via the bypass line. In the fully closed state of the bypass valve, the entire process air flowing through the process air discharge line is preferably conducted into the aircraft cabin.

Finally, the bypass valve may also be partially opened under the control of the control device, so that a portion of the process air flowing through the process air discharge line can be conducted into the aircraft cabin and the remaining portion of the process air flowing through the process air discharge line can be discharged into the aircraft environment. A partial opening of the bypass valve can be considered, for example, if the quality parameter of the process air indeed exceeds the threshold value, but a quality of the mixed air comprising process air and ambient air that is suitable for supplying to the aircraft cabin is achieved by suitable mixing of the portion of the process air not conducted away via the bypass line with the ambient air from the ambient air discharge line.

The bypass line branching off from the process air discharge line may open into a ram air duct. For example, the bypass line may open into the ram air duct in which the refrigerant condenser of the refrigerating apparatus is also arranged. The provision of an additional air outlet in an outer skin of an aircraft equipped with the aircraft air conditioning system can be eliminated by this.

The aircraft air conditioning system may further comprise a water trap arranged in the process air discharge line. The water trap may be arranged downstream of the process air cooling apparatus in the process air discharge line, wherein the term "downstream" refers here to the flow direction of the process air through the process air discharge line. The water trap, which may be executed in the form of a high-pressure separator, for example, can be used to separate water from the cooled process air flow in the flow through the process air cooling apparatus. Liquid water separated by the water trap from the process air flow can be conducted into a ram air duct, in order to be discharged with the ram air flowing through the ram air duct into the aircraft environment.

A heat exchanger may also be arranged in the process air discharge line, which is used to transfer additional thermal energy from the process air flowing through the process air discharge line, in particular downstream of the water trap, to the process air flowing through the process air supply line upstream of the process air cooling apparatus. The terms "downstream" and "upstream" refer here to the flow direction of the process air through the process air discharge line and the process air supply line.

Finally, a process air turbine may be arranged in the process air discharge line. The process air turbine is preferably arranged downstream of the heat exchanger in the process air discharge line. The term "downstream" refers here to the flow direction of the process air through the process air discharge line. The process air flowing through the process air discharge line is expanded in the process air turbine. The process air turbine is preferably coupled to the refrigerant compressor of the refrigerating apparatus, in order to drive the refrigerant compressor of the refrigerating apparatus.

The bypass line branches off from the process air discharge line preferably downstream of the process air turbine. The term "downstream" here refers again to the flow direction of the process air through the process air discharge line. Due to this the entire energy of the process air flowing through the process air discharge line can then be used to drive the process air turbine and consequently to drive the refrigerant compressor of the refrigerating apparatus if the process air flowing through the process air discharge line is discharged via the bypass line into the aircraft environment downstream of the process air turbine.

A direct connection may exist between the ambient air discharge line and the aircraft cabin or the mixing chamber. However, the ambient air discharge line preferably opens into the process air discharge line upstream of the mixing chamber or the aircraft cabin, so that the cooled ambient air can be conducted from the ambient air discharge line via the process air discharge line into the mixing chamber or the aircraft cabin. The ambient air discharge line may comprise a first ambient air discharge line branch, which may open into the process air discharge line upstream of the process air turbine and in particular upstream of the water trap. Furthermore, the ambient air discharge line may comprise a second ambient air discharge line branch, which may open into the process air discharge line downstream of the process air turbine. The terms "upstream" and "downstream" refer here to the flow direction of the process air through the process air discharge line. The ambient air flowing through the ambient air discharge line can be supplied via the first ambient air discharge line branch to a high-pressure area of the process air discharge line. In contrast to this, the second ambient air discharge line branch serves to conduct ambient air from the ambient air discharge line into a low-pressure area of the process air discharge line.

In flight mode of an aircraft equipped with the aircraft air conditioning system, the pressure of the ambient air flowing first through the ambient air supply line, then the ambient air cooling apparatus and subsequently the ambient air discharge line varies in dependence on the flight altitude of the aircraft. The design of the ambient air discharge line described above, with a first ambient air discharge line branch opening into a high-pressure area of the process air discharge line and a second ambient air discharge line branch opening into a low-pressure area of the process air discharge line, makes it possible to take account of this varying pressure of the ambient air when supplying the ambient air to the process air discharge line.

The control device of the aircraft air conditioning system may be configured to control the distribution of ambient air to the first ambient air discharge line branch and the second ambient air discharge line branch in dependence on the pressure of the ambient air flowing through the ambient air discharge line. In particular, the control device may be configured to conduct the ambient air via the first ambient air discharge line branch into the high-pressure area of the process air discharge line if the pressure of the ambient air flowing through the ambient air discharge line exceeds a threshold value. The control device may accordingly be configured to conduct the ambient air via the second ambient air discharge line branch into the low-pressure area of the process air discharge line if the pressure of the ambient air flowing through the ambient air discharge line is lower than the threshold value.

The control device may also be configured to control the ambient air flow through the ambient air discharge line in such a way that a first portion of the ambient air is conducted via the first ambient air discharge line branch into the high-pressure area of the process air discharge line, while a second portion of the flowing ambient air is conducted via the second ambient air discharge line branch into the low-pressure area of the process air discharge line. The ratio between the ambient air volume flow conducted into the first ambient air discharge line branch and the ambient air volume flow conducted into the second ambient air discharge line branch may be controlled by the control device depending on the pressure of the ambient air flowing through the ambient air discharge line. To control the ambient air supply to the first and the second ambient air discharge line branch, a suitable valve, in particular a three-way valve, which may have a variable flow cross section, may be arranged in the ambient air discharge line.

The second ambient air discharge line branch preferably opens into the process air discharge line not only downstream of the process air turbine, but also downstream of the branching-off of the bypass line from the process air discharge line. The term "downstream" refers again here to the flow direction of the process air through the air discharge line. If the process air flowing through the process air discharge line, i.e., at least a portion of the process air flowing through the process air discharge line, is not intended to reach the aircraft cabin, but is discharged via the bypass line into the aircraft environment, the ambient air flow through the ambient air discharge line is preferably controlled by the control device in such a way that the entire ambient air is conducted into the process air discharge line via the second ambient air discharge line branch downstream of the branching-off of the bypass line from the process air discharge line. It is ensured by this that the ambient air is not discharged together with the process air via the bypass line into the aircraft environment.

Another valve is preferably arranged in the process air discharge line between the branching-off of the bypass line from the process air discharge line and the opening of the second ambient air discharge line branch into the process air discharge line, which valve may be controlled, for example by the control device of the aircraft air conditioning system, in a synchronized manner with the bypass valve arranged in the bypass line, in order to control the process air flow through the bypass line. The other valve may have a variable flow cross section.

In particular, the other valve arranged in the process air discharge line between the branching-off of the bypass line from the process air discharge line and the opening of the second ambient air discharge line branch into the process air discharge line may be closed when the bypass valve is opened. It can be ensured by this that the entire cooled process air flowing through the process air discharge line is discharged into the aircraft environment and only cooled ambient air reaches the aircraft cabin. This arrangement further prevents ambient air from escaping into the aircraft environment via the bypass line. If only a portion of the process air flowing through the process air discharge line is to be discharged into the aircraft environment via the bypass line, the other valve may also be partially opened so that the desired process air volume flow can pass the other valve.

An ambient air compressor may be arranged in the ambient air supply line to compress the ambient air flowing through the ambient air supply line. The ambient air compressor may be formed in the form of a centrifugal compressor. In a preferred embodiment of the aircraft air conditioning system, the ambient air compressor is coupled to the process air turbine, so that the ambient air compressor can be driven by the process air turbine. For example, the refrigerant compressor, the ambient air compressor and the process air turbine may be arranged on a common shaft.

An ambient air precooler may also be arranged in the ambient air supply line, which is used to precool the ambient air flowing through the ambient air supply line before it is supplied to the ambient air cooling apparatus. The ambient air precooler is preferably coupled thermally to a ram air duct and, in particular, is arranged in the ram air duct, in which the refrigerant condenser of the refrigerating apparatus is also placed. The ambient air precooler may be formed in the form of a heat exchanger.

A process air precooler may be arranged in the process air supply line, which is used to precool the process air flowing through the process air supply line before it is supplied to the process air cooling apparatus. The process air precooler is preferably coupled thermally to a ram air duct and, in particular, is arranged in the ram air duct, in which the refrigerant condenser of the refrigerating apparatus and the ambient air precooler are also placed. Like the ambient air precooler, the process air precooler may also be formed in the form of a heat exchanger. With reference to the flow direction of the ram air through the ram air duct, the refrigerant condenser of the refrigerating apparatus is preferably arranged upstream of the ambient air precooler in the ram air duct. The ambient air precooler is preferably placed upstream of the process air precooler, on the other hand.

In flight mode of an aircraft equipped with the aircraft air conditioning system, the ram pressure building up in the area of an inlet of the ram air duct ensures an adequate supply of ram air to the ram air duct. In order to ensure an adequate flow of air through the ram air duct in ground operation of the aircraft also, a conveying device formed as a fan, for example, may be positioned in the ram air duct. The conveying device is preferably arranged in the ram air duct downstream of the process air precooler, wherein the term "downstream" here refers to the flow direction of the ram air through the ram air duct.

The bypass line opens into the ram air duct preferably downstream of a refrigerant condenser arranged in the ram air duct, an ambient air precooler arranged in the ram air duct and/or a process air precooler arranged in the ram air duct. In addition or alternatively to this, the bypass line may open into the ram air duct also downstream of a conveying device arranged in the ram air duct, wherein the term "downstream" here refers again to the flow direction of the ram air through the ram air duct. It is ensured by this that the cooling of the components arranged in the ram air duct by the ram air flowing through the ram air duct is not adversely affected due to the supply of process air from the bypass line.

The ambient air supply line may generally be connected directly to the aircraft environment. For example, a suitable opening may be provided in an outer skin of an aircraft equipped with the aircraft air conditioning system, via which opening the ambient air may be supplied to the ambient air supply line. It is also conceivable that the ambient air supply line branches off from a ram air duct. However, one inlet end of the ambient air supply line is preferably connected to a scoop inlet. Via the scoop inlet ambient air can be taken from an air layer that lies over a boundary layer building up along an outer skin of the aircraft in flight mode of an aircraft. The aerodynamic loss caused by the ambient air supply to the aircraft air conditioning system can be minimized by this. If desired or necessary, several scoop inlets may be provided for supplying ambient air to the aircraft air conditioning system.

In a preferred embodiment of the aircraft air conditioning system, an emergency fresh air supply line branches off from the ambient air supply line. The provision of an additional emergency ram air inlet (ERAI) can be eliminated by this, so that a further minimization of the aerodynamic losses of the aircraft is facilitated.

In a method for operating an aircraft air conditioning system, ambient air is conducted through an ambient air supply line. The ambient air flowing through the ambient air supply line is cooled by an ambient air cooling apparatus connected to the ambient air supply line. Ambient air cooled by the ambient air cooling apparatus is conducted through an ambient air discharge line, which is connectable to an aircraft cabin, in order to conduct ambient air cooled by the ambient air cooling apparatus into the aircraft cabin. Compressed process air is conducted through a process air supply line. The process air flowing through the process air supply line is cooled by a process air cooling apparatus connected to the process air supply line. Process air cooled by the process air cooling apparatus is conducted through a process air discharge line, which is connectable to the aircraft cabin, in order to conduct process air cooled by the process air cooling apparatus into the aircraft cabin. A refrigerant is circulated through a refrigerant circuit of a refrigerating apparatus, which circuit is thermally coupled to the ambient air cooling apparatus and the process air cooling apparatus, in order to transfer thermal energy from the ambient air cooling apparatus and the process air cooling apparatus to the refrigerant circulating in the refrigerant circuit. At least in certain operating phases of the aircraft air conditioning system, the cooled process air flowing through the process air discharge line is discharged through a bypass line branching off from the process air discharge line into an aircraft environment.

The process air flow through the bypass line may be controlled in dependence on an operating state of a process air source and/or in dependence on a composition of the cooled process air flowing through the process air discharge line. In particular, the process air flow through the bypass line may be controlled in such a way that the cooled process air flowing through the process air discharge line is discharged via the bypass line into the aircraft environment if a quality parameter of the process air exceeds a threshold value.

The process air flow through the bypass line may be controlled by a bypass valve arranged in the bypass line. Furthermore, the bypass line branching off from the process air discharge line may open into a ram air duct.

A water trap, a heat exchanger and/or a process air turbine may be arranged in the process air discharge line. The process air turbine may be coupled to a refrigerant compressor of the refrigerating apparatus, in order to drive the refrigerant compressor of the refrigerating apparatus. The bypass line may branch off from the process air discharge line downstream of the process air turbine.

The ambient air discharge line may open into the process air discharge line. The ambient air discharge line may also comprise a first ambient air discharge line branch, which opens into the process air discharge line upstream of the process air turbine, and a second ambient air discharge line branch, which opens into the process air discharge line downstream of the process air turbine and downstream of the branching-off of the bypass line from the process air discharge line. The ambient air flow through the ambient air discharge line may be controlled in such a way that the entire ambient air is conducted into the process air discharge line via the second ambient air discharge line branch downstream of the branching-off of the bypass line from the process air discharge line when at least the process air flowing through the process air discharge line is discharged via the bypass line into the aircraft environment.

The bypass line may open into the ram air duct downstream of a refrigerant condenser arranged in the ram air duct, an ambient air precooler arranged in the ram air duct and/or a process air precooler arranged in the ram air duct. An inlet end of the ambient air supply line may be connected to a scoop inlet.

An emergency fresh air supply may branch off from the ambient air supply line, in particular, upstream of the ambient air compressor.

BRIEF DESCRIPTION OF THE DRAWINGS

A preferred embodiment of the invention is now explained in greater detail with reference to the enclosed schematic drawing, in which The FIGURE shows an air conditioning system for air conditioning an aircraft cabin.

DETAILED DESCRIPTION OF THE PREFERRED EMBODIMENTS

Figure 1:
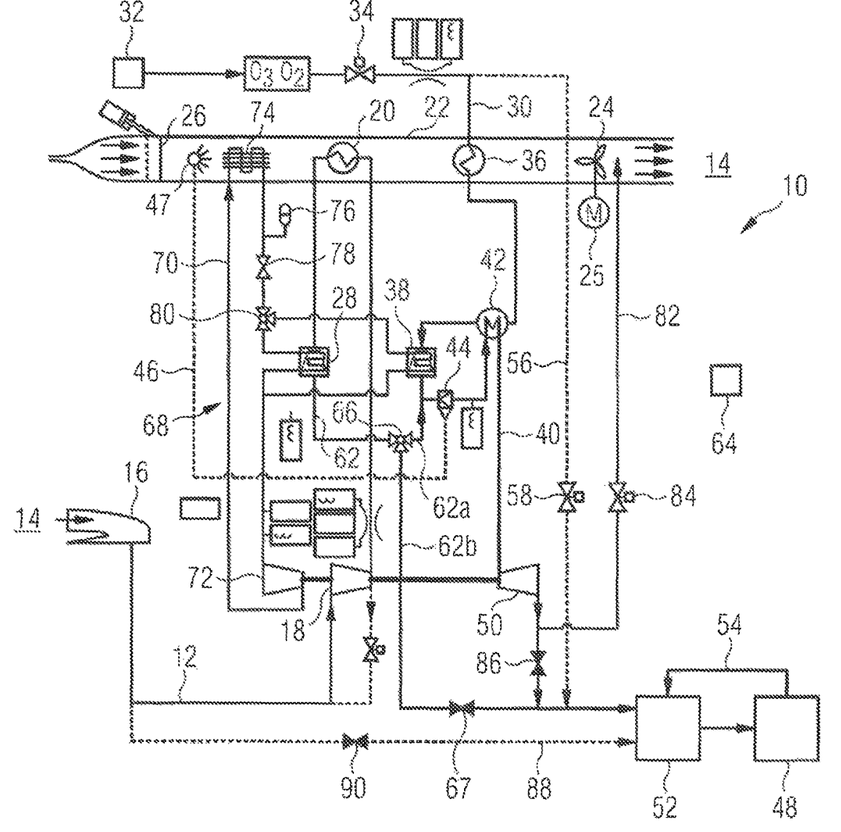

An aircraft air conditioning system 10 illustrated in the FIGURE shows an ambient air supply line 12 for the supply of ambient air from an aircraft environment 14 to the aircraft air conditioning system 10. An inlet end of the ambient air supply line 12 is connected to a scoop inlet 16. Via the scoop inlet 16, ambient air can be taken from an air layer and supplied to the ambient air supply line 12, which air layer lies above a boundary layer that builds up along an outer skin of the aircraft in flight operation of an aircraft equipped with the aircraft air conditioning system 10. Arranged in the ambient air supply line 12 is an ambient air compressor 18, which is used to compress the ambient air flowing through the ambient air supply line 12.

Arranged downstream of the ambient air compressor 18 in the ambient air supply line 12 is an ambient air precooler 20. The ambient air precooler 20 is used to precool the ambient air flowing through the ambient air supply line 12. The ambient air precooler is formed in the form of a heat exchanger and arranged in a ram air duct 22. Ambient air that is supplied to the ambient air precooler 20 via the ambient air supply line 12 can thus be cooled in the ambient air precooler 20 by the transfer of thermal energy to the ram air flowing through the ram air duct 22.

In flight mode of an aircraft equipped with the aircraft air conditioning system 10, ram air flows through the ram air duct 22 on account of the ram pressure building up in the area of an inlet of the ram air duct 22. To guarantee an adequate flow of air through the ram air duct 22 even in ground operation of the aircraft, a conveying device 24 in the form of a fan is provided in the ram air duct 22. The conveying device 24 is driven by an electric motor 25. The supply of ambient air to the ram air duct 22 is controlled by a ram air duct inlet flap 26.

Downstream of the ambient air precooler 20 the ambient air supply line 12 opens into an ambient air cooling apparatus 28. On flowing through the ambient air cooling apparatus 28, the ambient air is cooled to a desired low temperature.

The aircraft air conditioning system 10 further comprises a process air supply line 30. The process air supply line is connected to an engine 32 of the aircraft. Bleed air taken from the engine 32 is conducted as compressed process air through the process air supply line 30. The supply of process air to the process air supply line 30 is controlled by a valve 34. A process air precooler 36 is arranged in the process air supply line 30 and is used to precool the process air flowing through the process air supply line 30. Like the ambient air precooler 20, the process air precooler 36 is also formed as a heat exchanger and arranged in the ram air duct 22. In particular, the process air precooler 36 is positioned, relative to the flow direction of the ram air through the ram air duct 22, downstream of the ambient air precooler 20 in the ram air duct 22. In the process air precooler 36, process air flowing through the process air supply line 30 is cooled by the transfer of heat to the ram air flowing through the ram air duct 22.

Downstream of the process air precooler 36, the process air supply line 30 opens into a process air cooling apparatus 38. On flowing through the process air cooling apparatus 38 the process air is cooled to a desired low temperature. The process air cooling apparatus 38 is connected to a process air discharge line 40. A heat exchanger 42 is arranged in the process air discharge line 40 downstream of the process air cooling apparatus 38 and creates a thermal coupling between the cooled process air flowing through the process air discharge line 40 and the only precooled process air flowing through the process air supply line 30 and thereby ensures further cooling of the cooled process air flowing through the process air discharge line 40.

Liquid water that condenses out of the process air flow flowing through the process air discharge line 40 is separated from the process air flow by a water trap 44. In the embodiment of an aircraft air conditioning system shown in the FIGURE, the water trap 44 is formed as a high-pressure separator and is positioned between the process air cooling apparatus 38 and the heat exchanger 42 in the process air discharge line 40. Liquid water separated from the process air flow by the water trap 44 is conducted via a water discharge line 46 into the ram air duct 22. In particular, the water is injected into the ram air duct 20 by a water injection nozzle 47. The water evaporates in part and cools the ram air flowing through the ram air duct 22.

The process air discharge line 40 connects the process air cooling apparatus 38 to an aircraft cabin 48. Arranged downstream of the heat exchanger 42 in the process air discharge line 40 is a process air turbine 50, which serves to expand the process air flowing through the process air discharge line 40 to a desired pressure, so that the process air can be conducted into the aircraft cabin 48. Before it is supplied to the aircraft cabin 48, the process air expanded in the process air turbine 50 is conducted into a mixing chamber 52, where the process air is mixed with recirculation air, which is supplied to the mixing chamber 52 from the aircraft cabin 48 via a recirculation air line 54. A trim air line 56, in which a trim air control valve 58 is arranged for controlling a trim air flow through the trim air line 56, branches off from the process air supply line 30 upstream of the process air precooler 36 and opens into the process air discharge line 40 upstream of the mixing chamber 52.

The ambient air cooling apparatus 28 is connected to an ambient air discharge line 62, which is connected to the aircraft cabin 48 via the mixing chamber 52. In particular, the ambient air discharge line 62 opens into the process air discharge line 40, so that the cooled ambient air flowing through the ambient air discharge line 62 can be conducted via the process air discharge line 40 into the mixing chamber 52 and finally into the aircraft cabin 48. The ambient air discharge line 62 comprises a first ambient air discharge line branch 62*a*, which opens upstream of the process air turbine 50, i.e., between the process air cooling apparatus 38 and the water trap 44, into the process air discharge line 40. The ambient air discharge line 62 further comprises a second ambient air discharge line branch 62*b*, which opens into the process air discharge line 40 downstream of the process air turbine 50. The ambient air flowing through the ambient air discharge line 62 can be supplied via the first ambient air discharge line branch 62*a* to a high-pressure area of the process air discharge line 40. In contrast to this, the ambient air flowing through the ambient air discharge line 62 can be conducted via the second ambient air discharge line branch 62*b* into a low-pressure area of the process air discharge line 40.

The pressure of the ambient air flowing through the ambient air supply line 12 and, after flowing through the ambient air cooling apparatus 28, also through the ambient air discharge line 62 varies in flight mode of an aircraft equipped with the aircraft air conditioning system 10 depending on the flight altitude of the aircraft. The supply of ambient air to the first ambient air discharge line branch 62*a* and the second ambient air discharge line branch 62*b* is therefore controlled by a control device 64 in dependence on the pressure of the ambient air flowing through the ambient air discharge line 62. In particular, the control device 64 controls a three-way valve 66 arranged in the ambient air discharge line 62 in such a way that the ambient air flowing through the ambient air discharge line 62 is conducted via the first ambient discharge line branch 62*a* into the high-pressure area of the process air discharge line 40 when the pressure of the ambient air flowing through the ambient air discharge line 62 exceeds a threshold value. In contrast to this, the control device 64 controls the three-way valve 66 in such a way that the ambient air flowing through the ambient air discharge line 62 is conducted via the second ambient air discharge line branch 62b into the low-pressure area of the process air discharge line 40 when the pressure of the ambient air flowing through the ambient air discharge line 62 is lower than the threshold value. A valve 67 arranged in the second ambient air discharge line branch 62b is used to control the ambient air flow through the second ambient air discharge line branch 62b.

The aircraft air conditioning system 10 further comprises a refrigerating apparatus 68, which comprises a refrigerant circuit 70 through which a refrigerant can flow. The refrigerant circuit 70 is thermally coupled to the ambient air cooling apparatus 28 and the process air cooling apparatus 38, in order to transfer thermal energy from the ambient air cooling apparatus 28 and the process air cooling apparatus 38 to the refrigerant circulating in the refrigerant circuit 70. In the embodiment of an aircraft air conditioning system 10 shown in the FIGURE, the refrigerant circulating in the refrigerant circuit 70 of the refrigerating apparatus 68 is a two-phase refrigerant, such as R134A (CH2F—CF3), CO2 or R245fa (1,1,1,3,3-pentafluoropropane), for example. A refrigerant compressor 72, a refrigerant condenser 74, a refrigerant collector 76 and an expansion valve 78 are arranged in the refrigerant circuit 70.

The refrigerant compressor 72 is executed in the form of a centrifugal compressor and is used to compress the refrigerant circulating through the refrigerant circuit 70. The process air turbine 50, the ambient air compressor 18 and the refrigerant compressor 72 are arranged on a common shaft so that the process air turbine 50 drives both the ambient air compressor 18 and the refrigerant compressor 72. The refrigerant condenser 74 is arranged in the refrigerant circuit 70 downstream of the refrigerant compressor 72 and is in the form of a heat exchanger. The refrigerant condenser 74 in the form of a heat exchanger is arranged upstream of the ambient air precooler 20 in the ram air duct 22, so that the refrigerant flowing through the refrigerant condenser 74 can be cooled by the transfer of thermal energy to the ram air flowing through the ram air duct 22. The refrigerant collector 76 is arranged downstream of the refrigerant condenser 74 in the refrigerant circuit 70 of the refrigerating apparatus 68 and is used for interim storage of refrigerant emerging from the condenser 74 in the liquid state of aggregation. The expansion valve 78 is positioned in the refrigerant circuit 70 downstream of the refrigerant collector 76.

The ambient air cooling apparatus 28 and the process air cooling apparatus 38 are arranged in the refrigerant circuit 70 of the refrigerating apparatus 68 downstream of the expansion valve 78, wherein both the ambient air cooling apparatus 28 and the process air cooling apparatus 38 are in the form of a refrigerant evaporator. The ambient air flowing through the ambient air cooling apparatus 28 and the process air flowing through the process air cooling apparatus 38 are thus cooled by the emission of thermal energy to the refrigerant circulating in the refrigerant circuit 70, which is transformed from the liquid to the gaseous state of aggregation upon taking up the thermal energy from the ambient air and the process air. The ambient air cooling apparatus 28 and the process air cooling apparatus 38 are arranged parallel to one another in the refrigerant circuit 70, wherein the supply of refrigerant to the ambient air cooling apparatus 28 and the process air cooling apparatus 38 is controlled by a valve 80 arranged in the refrigerant circuit 70.

The aircraft air conditioning system 10 further comprises a bypass line 82 branching off from the process air discharge line 40. The bypass line 82 is configured to discharge cooled process air flowing through the process air discharge line 40 into the aircraft environment 14 at least in certain operating phases of the aircraft air conditioning system 10. In the embodiment of an aircraft air conditioning system 10 illustrated in the FIGURE, the bypass line 82 branches off from the process air discharge line 40 downstream of the process air turbine 50 and opens into the ram air duct 22 downstream of the conveying device 24 and thus also downstream of the water injection nozzle 47, the refrigerant condenser 74, the ambient air precooler 20 and the process air precooler 36, so that the process air flowing through the bypass line 82 is discharged into the aircraft environment via the ram air duct 22.

A bypass valve 84 is arranged in the bypass line 82 for controlling the process air flow through the bypass line 82. The second ambient air discharge line branch 62b opens into the process air discharge line 40 downstream of the branching-off of the bypass line 82 from the process air discharge line 40. Another valve 86 is arranged in the process air discharge line 40 between the branching-off of the bypass line 82 from the process air discharge line 40 and the opening of the second ambient air discharge line branch 62b into the process air discharge line 40.

Under the control of the control device 64, the aircraft air conditioning system 10 is thus operable in a mixed air mode in which both cooled process air and cooled ambient air is supplied to the aircraft cabin 48. If the aircraft air conditioning system 10 is operated in mixed air mode, the bypass valve 84 is closed, whereas the other valve 86 is open, so that the process air flowing through the process air discharge line 40 can enter the aircraft cabin 48 via the mixing chamber 52. If desired or necessary, i.e., if no process air is to be conducted from the process air discharge line 40 into the aircraft cabin 48 in certain operating phases of the aircraft air conditioning system 10, the aircraft air conditioning system 10 can be operated also in a pure ambient air mode, in which no process air from the process air discharge line 40 but only ambient air from the ambient air discharge line 62 is supplied to the aircraft cabin 48.

The control device 64 is configured, in particular, to control the process air flow through the bypass line 82 in dependence on an operating state of a process air source formed by the engine 32 and/or in dependence on a composition of the cooled process air flowing through the process air discharge line 40. For example, the process air flow through the bypass line 82 can be controlled by the control device 64 in such a way that the cooled process air flowing through the process air discharge line 40 is discharged via the bypass line 82 into the aircraft environment 14 if the process air does not have the desired composition and, in particular, if a quality parameter of the process air exceeds a threshold value. The quality parameter of the process air can be a limit value of a substance contained in the process air, for example, which should not be exceeded.

In the fully open state of the bypass valve 84, when the other valve 86 is closed at the same time, the entire process air flowing through the process air discharge line 40 is conducted away into the aircraft environment 14 via the bypass line 82. In the fully closed state of the bypass valve 84, on the other hand, under the precondition that the other valve 86 is open, the entire process air flowing through the process air discharge line 40 is conducted into the aircraft cabin 48. Finally, the bypass valve 84 and the other valve 86 can also each be partially open under the control of the control device 64, so that a portion of the process air flowing through the process air discharge line 40 can be conducted into the aircraft cabin 48 and the remaining portion of the process air flowing through the process air discharge line 40 can be discharged into the aircraft environment 14.

Finally, the aircraft air conditioning system 10 comprises an emergency fresh air supply line 88, which branches off from the ambient air supply line 12 and opens into the mixing chamber 52. The provision of an additional emergency ram air inlet (ERAI) can be eliminated by this. A valve 90 arranged in the emergency fresh air supply line 88 is used to control the ambient air flow through the emergency fresh air supply line 88.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft air conditioning system, which comprises:
    an ambient air supply line adapted to be flown through with ambient air,
    an ambient air cooling apparatus, connected to the ambient air supply line and configured to cool the ambient air flowing through the ambient air supply line,
    an ambient air discharge line, connected to the ambient air cooling apparatus and configured to connect to an aircraft cabin, in order to conduct ambient air cooled by the ambient air cooling apparatus into the aircraft cabin,
    a process air supply line, adapted to be flown through with compressed process air,
    a process air cooling apparatus, which is connected to the process air supply line and is configured to cool the compressed process air flowing through the process air supply line,
    a process air discharge line, connected to process air cooling apparatus and configured to connect to the aircraft cabin, in order to conduct process air cooled by the process air cooling apparatus into the aircraft cabin,
    a refrigerating apparatus, comprising a refrigerant circuit adapted to be flown through with a refrigerant and being thermally coupled to the ambient air cooling apparatus and the process air cooling apparatus, in order to transfer thermal energy from the ambient air cooling apparatus and the process air cooling apparatus to the refrigerant circulating in the refrigerant circuit, and
    a bypass line branching off from the process air discharge line, which bypass line is configured to direct cooled process air flowing through the process air discharge line away from an aircraft cabin and to discharge cooled process air flowing through the process air discharge line into an aircraft environment, at least in certain operating phases of the aircraft air conditioning system, wherein the bypass line branching off from the process air discharge line opens into a ram air duct.

2. The aircraft air conditioning system according to claim 1, wherein a bypass valve is arranged in the bypass line for controlling the process air flow through the bypass line.

3. The aircraft air conditioning system according to claim 1, wherein at least one of:
    at least one of a water trap, a heat exchanger and a process air turbine is arranged in the process air discharge line,
    the process air turbine is coupled to a refrigerant compressor of the refrigerating apparatus, in order to drive the refrigerant compressor of the refrigerating apparatus, or
    the bypass line branches off from the process air discharge line downstream of the process air turbine.

4. The aircraft air conditioning system according to claim 1, wherein the ambient air discharge line opens into the process air discharge line and comprises a first ambient air discharge line branch, which opens into the process air discharge line upstream of a process air turbine, and a second ambient air discharge line branch, which opens into the process air discharge line downstream of the process air turbine and downstream of the branching-off of the bypass line from the process air discharge line, wherein an entire amount of the ambient air is conducted via the second ambient air discharge line branch into the process air discharge line downstream of the branching-off of the bypass line from the process air discharge line when the process air flowing through the process air discharge line is discharged into the aircraft environment via the bypass line.

5. The aircraft air conditioning system according to claim 1, wherein the bypass line opens into the ram air duct downstream of at least one of:
    a refrigerant condenser arranged in the ram air duct,
    an ambient air precooler arranged in the ram air duct, or
    a process air precooler arranged in the ram air duct.

6. The aircraft air conditioning system according to claim 1, wherein an inlet end of the ambient air supply line is connected to a scoop inlet.

7. The aircraft air conditioning system according to claim 1, wherein an emergency fresh air supply line branches off from the ambient air supply line upstream of an ambient air compressor.

8. A method for operating an aircraft air conditioning system comprising the steps:
    conducting ambient air through an ambient air supply line,
    cooling the ambient air flowing through the ambient air supply line by an ambient air cooling apparatus connected to the ambient air supply line,
    conducting ambient air cooled by the ambient air cooling apparatus through an ambient air discharge line, configured to connect to an aircraft cabin, in order to conduct ambient air cooled by the ambient air cooling apparatus into the aircraft cabin,
    conducting compressed process air through a process air supply line,
    cooling the process air flowing through the process air supply line by a process air cooling apparatus connected to the process air supply line,
    conducting process air cooled by the process air cooling apparatus through a process air discharge line, which is connectable to the aircraft cabin, in order to conduct process air cooled by the process air cooling apparatus into the aircraft cabin, and
    circulating a refrigerant through a refrigerant circuit of a refrigerating apparatus, which is thermally coupled to the ambient air cooling apparatus and to the process air cooling apparatus, in order to transfer thermal energy from the ambient air cooling apparatus and the process air cooling apparatus to the refrigerant circulating in the refrigerant circuit, wherein, at least in certain operating phases of the aircraft air conditioning system, cooled process air flowing through the process air discharge line is discharged into an aircraft environment by a bypass line branching off from the process air discharge line and directing cooled process flowing through the process air discharge line away from the aircraft cabin, wherein the bypass line branching off from the process air discharge line opens into a ram air duct.

9. The method according to claim 8, wherein the process air flow through the bypass line is controlled in dependence on at least one of an operating state of a process air source or a composition of the cooled process air flowing through the process air discharge line, wherein the process air flow through the bypass line is controlled in such a way that the cooled process air flowing through the process air discharge line is discharged into the aircraft environment via the bypass line if a quality parameter of the process air exceeds a threshold value.

10. The method according to claim 8, wherein the process air flow through the bypass line is controlled by a bypass valve arranged in the bypass line.

11. The method according to claim 8, wherein at least one of:
    at least one of a water trap, a heat exchanger or a process air turbine is arranged in the process air discharge line,
    the process air turbine preferably is coupled to a refrigerant compressor of the refrigerating apparatus, in order to drive the refrigerant compressor of the refrigerating apparatus, or
    the bypass line branches off from the process air discharge line downstream of the process air turbine.

12. The method according to claim 8, wherein the ambient air discharge line opens into the process air discharge line and comprises a first ambient air discharge line branch, which opens into the process air discharge line upstream of the process air turbine, and a second ambient air discharge line branch, which opens into the process air discharge line downstream of a process air turbine and downstream of the branching-off of the bypass line from the process air discharge line, wherein the ambient air flow through the ambient air discharge line is controlled in such a way that the entire ambient air is conducted via the second ambient air discharge line branch into the process air discharge line downstream of the branching-off of the bypass line from the process air discharge line when the process air flowing through the process air discharge line is discharged via the bypass line into the aircraft environment.

13. The method according to claim 8, wherein the bypass line opens into the ram air duct downstream of at least one of a refrigerant condenser arranged in the ram air duct, an ambient air precooler arranged in the ram air duct and a process air precooler arranged in the ram air duct.

14. The method according to claim 8, wherein an inlet end of the ambient air supply line is connected to a scoop inlet.

15. The method according to claim 8, wherein an emergency fresh air supply line branches off from the ambient air supply line upstream of an ambient air compressor.

* * * * *